United States Patent Office 3,087,144
Patented Apr. 23, 1963

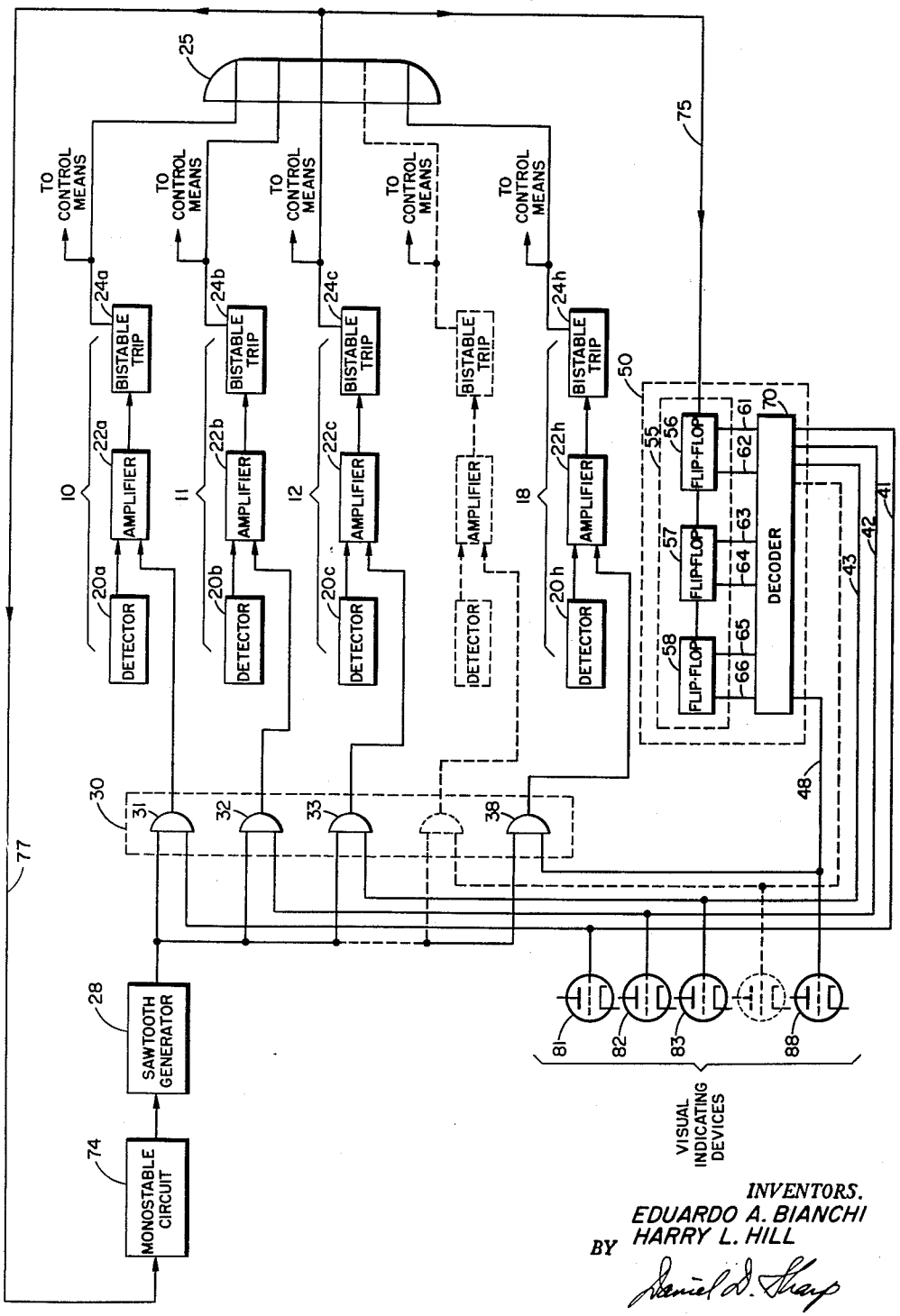

3,087,144
RAMP SELF-TESTING SYSTEM
Eduardo A. Bianchi and Harry L. Hill, Rochester, N.Y., assignors to General Dynamics Corporation, Rochester, N.Y., a corporation of Delaware
Filed June 26, 1961, Ser. No. 119,586
5 Claims. (Cl. 340—213)

This invention relates to a system for testing one or more operational channels of control equipment sequentially for proper operation and for indicating malfunction preset in one or more of said channels.

It is often essential that critical elements of the operational channels of control and safety equipment be tested continuously and automatically for proper operation. It is further desirable to indicate visually or audibly when the tested elements deviate from a preset limit. In typical control and safety equipment, each of the channels to be tested has associated therewith a bistable device which is tripped from one stable state to another stable state in response to analog signals of predetermined maximum level which represent a particular type of information. Tripping of a given bistable device causes an associated control means to be operated upon so as to exercise some desired control function. The manner in which each bistable device operates upon the control device, however, does not form a part of the present invention.

In a copending application for a United States Letters Patent of Bianchi and Hill, Serial No. 99,974, filed January 19, 1961, a system for testing for proper operation of such bistable devices is described. In this system, the various bistable devices are stimulated simultaneously at intervals by test pulses of short duration compared with the analog information supplied to the bistable devices. If a given bistable device is operated properly, it will respond to the test pulse by making an excursion to the opposite state for a short period of time. The output of each bistable device is examined sequentially by sequence controlling means including some sort of stepping switch and several indicating elements, one for each bistable device. If all bistable devices are functioning properly, the visual indicating elements will be activated sequentially; however, if a particular bistable device becomes incapable of switching properly, sequencing operation will be arrested and the associated indicator element will remain activated.

The system described in the aforesaid copending application is capable of testing only the bistable devices of each control channel. The system further requires that the various bistable devices be of substantially identical design capable of receiving a pulse of a certain duration and character. In many applications, it is desirable to test the operation of each channel, in which a given bistable device is but a part, in its entirety. The channels may operate at different levels, each of which is capable of separate adjustment.

The system according to the invention is capable of testing continuously the various channels, including the bistable devices associated therewith, for proper operation. The channels are tested one at a time in sequential fashion. A voltage or current ramp is produced in response to recurring trigger pulses and is supplied to the channel under test. The output of this channel increases in correspondence with the ramp signal until the trip point of the associated bistable device is reached. The bistable device then switches to the alternate state. This switching action is rapidly detected and the ramp is restored to a level below the signal level present at the channel input. If the operation of the channel, including the associated bistable device, is satisfactory, the output from the switching bistable device actuates a stepping device which permits the next ramp voltage to be supplied to the input of a succeeding channel to be tested.

The advantage of the system according to the invention is that several operating channels with different information content may be tested readily and the bistable trip circuits need not be designed to have similar characteristics.

Other objects and advantages of the invention will become apparent from the description and the drawing wherein FIG. 1 is a block diagram of a self-testing system according to the invention.

Referring to the drawing, a system is shown including a plurality of channels 10 to 18, each of which include a detector 20 for providing a signal of amplitude dependent upon the magnitude of the parameter being investigated, an amplifier 22 for amplifying the signal, and a bistable device 24 coupled to the amplifier 22. The bistable device 24 is tripped to the opposite state, that is, the voltage level of an output circuit thereof is changed from one value to a second value, whenever the amplitude of the input to the bistable device reaches a predetermined magnitude. This magnitude may well differ for each of the channels.

The system according to the invention may include any number of channels to be tested; however, a system incorporating eight channels is shown, by way of example, in FIG. 1. Each bistable device may have one output or two. The voltage at one of these outputs may be at one level when untripped but at a more negative level when tripped. The voltage at the other output circuit is more positive when tripped than when untripped. The particular one of the pair of output circuits which is used in such bistable devices is immaterial; the only restriction imposed is that, where both types of output circuits are used together for the various channels, the voltages appearing at one of the types of output circuits must be inverted in polarity before application to the sequence mixer 25. The sequence mixer essentially is an OR gate which permits passage of any one of the output voltages from the various channel bistable devices. A sawtooth generator 28, when triggered in a manner to be shown subsequently, generates a sawtooth signal or ramp. This ramp is applied simultaneously to each of the AND circuits 31 to 38 which together form the sequence gate 30. These AND circuits will allow passage of the ramp only when an input voltage is present on a corresponding one of the output lines 41 to 48 of sequence generator 50.

The sequence generator 50 comprises a binary counter 55 which includes a sufficient number of flip-flops 56, 57 and 58 to provide a binary count equal to the number of channels being tested. At any given instant, each of the binary counter flip-flops 55 to 58 will be in some particular state so that the voltage on lines 61 to 66 of the binary counter will present a unique pattern of voltages at two different levels. The sequence generator 50 also includes a decoder 70 for converting the binary information available at the binary counter output lines 61 to 66 to a single voltage level on one only of the output lines 41 to 48 of the sequence generator 50. The decoder 70 operates according to well known principles and may consist, for example, of a diode matrix which delivers a positive-going pulse when all diodes connected between output lines 61 to 66 of the binary counter 55 and a particular decoder output line are reverse biased. Each decoder output line is associated with a particular channel to be tested.

In order to explain further the operation of the system, it will be assumed that, at the instant the system is placed in operation, the binary counter 55 is at a count such that an output voltage is developed on decoder output line 41. This output voltage enables AND circuit 31 in sequence gate 30 and passes the ramp generated by sawtooth generator 28 to the input circuit of amplifier 22a in channel 10. The input voltage to amplifier 22a is a function of the instantaneous ramp voltage and the output voltage level at the detector 20a. It will be evident that the higher the steady state value of the detector voltage, the greater is the resultant input voltage to amplifier 22, at any given instant after initiation of the ramp. Consequently, if the critical level for tripping the bistable device and the gain of the amplifier is unchanged, the time taken for the amplified composite voltage to reach the trip point of the bistable device will decrease. The minimum period between adjacent test ramps cannot be less than the maximum time taken for a given composite voltage at the input of the amplifier to reach a value which, multiplied by the amplification factor of the amplifier, will just trip the associated bistable device. Considerable latitude is given the designer in setting up each of the channels, without affecting the ability of the testing system to check for proper operation of each channel in its entirety. The gain of amplifier 22a is adjusted so as to amplify the voltage level at the detector 20a to a value just sufficient to trip the bistable device 24a when the critical level of voltage at detector 20a is reached. The critical level is the voltage at the detector output obtained when the parameter to be measured reaches its maximum permissible value.

As the magnitude of the ramp voltage gradually increases, it evidently becomes sufficiently large, after amplification in channel amplifier 22a and in combination with any available steady state output at detector 20a, to trip bistable device 24a to the alternate state. When the bistable trip circuit 24a is thus tripped, an output pulse is obtained from the output circuit which is applied to the OR circuit 25. As soon as this pulse passes OR circuit 25, it is coupled rapidly by way of line 77 to a monostable circuit 74 which generates a voltage waveform of such polarity as to cause the ramp to return to its initial level— a level which is below that at which the most sensitive channel will be activated. This operation is necessary in order to obviate the possibility of the channel performing a control function in the absence of detected analog information. After a period determined by the delay built into circuit 74, the voltage waveform from this circuit terminates and the voltage level at the input to sawtooth generator 28 returns to its original value. Operation of the sawtooth generator is now initiated and a ramp is generated which starts from the same level as the preceding ramp. The amount of delay between the termination of a ramp and the initiation of the succeeding ramp will depend upon the time interval desired between testing of adjacent channels.

The output pulse from the tripped bistable device 24a, after passage through OR circuit 25, is coupled also by way of line 75 to binary counter 55 of the sequence generator 50, whereupon an output voltage appears on the next decoder output line 42. This output voltage on line 42 is applied to the AND circuit 32 in sequence gate 30 and permits the ensuing ramp from sawtooth generator 28 to pass and to be combined with any available input signal at detector 20b of channel 11. When the gradually increasing resulting voltage at the input to amplifier 22b of channel 11 reaches a value equal to the critical voltage for detector 20b, the bistable trip 24b will be tripped and an output pulse therefrom passing through OR circuit 25 will step the counter 55 to the next position, whereby an output voltage appears on decoder output line 43.

It is now apparent that each of the channels 10 to 18 are tested in sequence and that, so long as operation is normal, the sequence of testing repeats at a rate determined to a considerable extent by the delay established between the initiation of adjacent ramps, but also upon the sum of the durations of each sawtooth required for tripping the various bistable devices.

Visual indicating devices 81 to 88, one for each channel to be tested, are connected to respective decoder output lines 41 to 48. These indicating devices, for example, may be grid-controlled filamentary anode vacuum tubes having the anode coated with a luminescent material and the grid connected to a corresponding decoder output line. As an output voltage is developed on each decoder output line, the corresponding indicator tube becomes conductive and a visible glow appears on the anode. Proper operation of the various channels 10 to 18 is indicated by sequential flashes of indicator tubes 81 to 88 in the respective decoder output lines 41 to 48. The duration of the flashing cycle will depend, to a considerable extent, upon the rate of recurrence of ramps, which, in turn, will depend upon the length of time between ramps established by circuit 74. The delay introduced by circuit 74 may be set so that the sequence of illumination of the indicating devices 81 to 88 will be just slow enough to be visible readily to the eye.

As soon as one of the channels ceases to function properly, an output pulse is no longer available at its bistable device 24. Consequently, no pulse is available to step the binary counter 55 to its next condition and there can be no further sequential stepping of binary counter 55. In other words, further sequential illumination of all other indicator tubes is prevented and the indicator tube corresponding to the defective channel remains illuminated.

What is claimed is:

1. In a system for testing a plurality of channels each including a detector, an amplifier and a bistable device, means for producing a ramp signal starting from a predetermined level, said bistable devices each normally producing output information of a particular characteristic when the output voltage at the associated detector reaches a critical level, a distinct output medium corresponding to each of said channels, counting means for energizing one of said output media in accordance with a particular count pattern, and gating means opened in response to energization of one of said output media for supplying said ramp signal to a corresponding channel, the bistable device of the channel which is receptive of said ramp signal producing output information of said particular characteristic when the input voltage at the corresponding amplifier reaches said critical level, said counting means being operated upon by output information of said particular characteristic from a given bistable device to energize the succeeding output medium.

2. In a system for testing a plurality of channels each including a detector, an amplifier and a bistable device, means for producing a ramp starting from a predetermined level, said bistable devices each normally producing output information of a particular characteristic when the output voltage at the associated detector reaches a critical level, a distinct output medium corresponding to each of said channels, counting means for energizing one of said output media in accordance with a particular count pattern, gating means opened in response to energization of one of said output media for supplying said ramp to the amplifier of a corresponding channel, the bistable device of the channel which is receptive of said ramp producing output information of said particular characteristic when the input voltage at the corresponding amplifier reaches said critical level, said counting means being operated upon by output information of said particular characteristic from a given bistable device to energize the succeeding output medium, said counting means being sequentially advanced through succeeding counts during the presence of each ramp only when all of said channels are functioning properly, and a plurality of indicating means each connected to a different output media and activated during the energization of the corresponding output medium, said output information of said particular characteristic operating upon said ramp producing means for returning the ramp to its starting level.

3. In a system for testing a plurality of channels each including a detector, an amplifier and a bistable device, means for producing a ramp voltage starting from a predetermined level, said bistable devices each normally producing output information of a particular characteristic when the output voltage at the associated detector reaches a critical level, a distinct output medium corresponding to each of said bistable devices, counting means for energizing one of said output media in accordance with a particular count pattern, gating means opened in response to energization of one of said output media for supplying said ramp voltage to the amplifier of a corresponding channel, the bistable device of the channel which is receptive of said ramp voltage producing output information of said particular characteristic when the input voltage at the corresponding amplifier reaches said critical level, said counting means being operated upon by output information of said particular characteristic from a given bistable device to energize the succeeding output medium, said counter being sequentially advanced through succeeding counts during the presence of each ramp voltage only when all of said channels are functioning properly, and a plurality of indicating means each connected to a different output media and activated during the energization of the corresponding output medium, delay means responsive to said output information of said particular characteristic for causing said ramp voltage generated by said ramp voltage producing means to return to its starting level and for initiating a further ramp voltage after a preset delay.

4. In a system for testing a plurality of channels each including a detector, an amplifier and a bistable device, means for producing a ramp voltage starting from a predetermined level, each of said bistable devices normally producing output information of a particular characteristic when the output voltage at said detector reaches a critical level, counting means having as many count conditions as there are bistable devices, said counting means including several output lines each corresponding to one distinct count condition and arranged in the same sequence as said bistable devices, said counting means providing an output signal only on that one of said output lines corresponding to the count condition then existing, gating means opened in response to an output signal on an output line for supplying said ramp voltage to the channel corresponding thereto, said bistable device of the channel which is receptive of said ramp voltage producing output information of said particular characteristic when the input voltage at the corresponding amplifier reaches said critical level, means for conveying available output information of said particular characteristic from a corresponding bistable device to said counting means, said counting means being transferred to a succeeding count condition during said transfer of output information of said particular characteristic for producing an output signal on the succeeding output line, and a multiplicity of visual indicating devices each responsive to a different one of said output signals for providing a sequential display when all of said channels are operating in the desired manner and a stationary indication only from that one of said devices associated with the channel first determined to be operating improperly.

5. In a system for testing a plurality of channels each including a detector, an amplifier and a bistable device, means for producing a ramp voltage starting from a predetermined level, each of said bistable devices normally producing output information of a particular characteristic when the output voltage at said detector reaches a critical level, counting means having as many count conditions as there are bistable devices, said counting means including several output lines each corresponding to one distinct count condition and arranged in the same sequence as said bistable devices, said counting means providing an output signal only on that one of said output lines corresponding to the count condition then existing, gating means opened in response to an output signal on an output line for supplying said ramp voltage to the channel corresponding thereto, said bistable device of the channel which is receptive of said ramp voltage producing output information of said particular characteristic when the input voltage at the corresponding amplifier reaches said critical level, means for conveying available output information of said particular characteristic from a corresponding bistable device to said counting means, said counting means being transferred to a succeeding count condition during said transfer of output information of said particular characteristic for producing an output signal on the succeeding output line.

References Cited in the file of this patent

UNITED STATES PATENTS

| | | |
|---|---|---|
| 2,793,344 | Raynolds | May 21, 1957 |
| 2,883,255 | Anderson | Apr. 21, 1959 |
| 2,883,651 | Akerlund | Apr. 21, 1959 |
| 2,907,989 | Guerber | Oct. 6, 1959 |
| 2,942,242 | Sharp | June 21, 1960 |
| 2,948,884 | Guerber et al. | Aug. 9, 1960 |